(12) United States Patent
Song

(10) Patent No.: US 12,258,998 B1
(45) Date of Patent: Mar. 25, 2025

(54) CONNECTING ROD PIECE

(71) Applicant: Yong Song, Hangzhou (CN)

(72) Inventor: Yong Song, Hangzhou (CN)

( * ) Notice: Subject to any disclaimer, the term of this patent is extended or adjusted under 35 U.S.C. 154(b) by 0 days.

(21) Appl. No.: 18/656,954

(22) Filed: May 7, 2024

(30) Foreign Application Priority Data

Apr. 24, 2024 (CN) .................... 202420854617.9

(51) Int. Cl.
| | |
|---|---|
| *E06B 9/44* | (2006.01) |
| *A47H 1/06* | (2006.01) |
| *F16B 7/18* | (2006.01) |
| *A47H 1/04* | (2006.01) |

(52) U.S. Cl.
CPC ............... *F16B 7/182* (2013.01); *A47H 1/06* (2013.01); *E06B 9/44* (2013.01); *A47H 2001/042* (2013.01)

(58) Field of Classification Search
CPC .. A47H 1/02; A47H 1/022; A47H 2001/0215; A47H 1/011; A47H 13/00; E06B 9/44; E06B 2009/407; F16B 7/182
See application file for complete search history.

(56) References Cited

U.S. PATENT DOCUMENTS

| | | | | |
|---|---|---|---|---|
| 515,218 | A * | 2/1894 | Hartshorn ................. | E06B 9/44 54/7 |
| 1,083,741 | A * | 1/1914 | Hult .......................... | E06B 9/44 160/394 |
| 1,099,258 | A * | 6/1914 | Koziell ..................... | E06B 9/44 160/263 |
| 1,550,701 | A * | 8/1925 | Hoyt ........................ | E06B 9/44 403/104 |
| 5,606,410 | A * | 2/1997 | Peclier ..................... | G01N 21/88 356/392 |
| 8,051,993 | B1 * | 11/2011 | Tu ............................ | E06B 9/44 211/123 |
| 2001/0017193 | A1 * | 8/2001 | Duric ....................... | E06B 9/44 160/321 |
| 2011/0001315 | A1 * | 1/2011 | Fischer ................... | F16B 7/0413 285/31 |
| 2013/0029792 | A1 * | 1/2013 | Abdelmalek ........... | A63B 60/50 403/361 |
| 2015/0047283 | A1 * | 2/2015 | Frey ....................... | E04B 1/5831 52/309.1 |
| 2016/0083998 | A1 * | 3/2016 | Grützner .................. | E06B 9/50 160/238 |
| 2019/0360648 | A1 * | 11/2019 | Hsieh ..................... | F21V 21/108 |

\* cited by examiner

*Primary Examiner* — Johnnie A. Shablack
*Assistant Examiner* — Matthew R. Shepherd

(57) ABSTRACT

A connecting rod piece includes a hollow first connecting rod unit, a connecting device, a hollow second connecting rod unit, a first locking member and a second locking member. A side wall of the first connecting rod unit is provided with a first mounting slot. The connecting device has a first end and a second end. A side wall of the second connecting rod unit is provided with a second mounting slot. The first locking member detachably locks the first end of the connecting device to the first connecting rod unit. The second locking member detachably locks the second end of the connecting device to the second connecting rod unit. When the connecting rod piece needs to be mounted, the first connecting rod unit and the second connecting rod unit can be combined into a whole through the connecting device.

7 Claims, 9 Drawing Sheets

CONNECTING ROD PIECE

CROSS-REFERENCE TO RELATED APPLICATIONS

The application claims priority of Chinese patent application CN202420854617.9, filed on Apr. 24, 2024, which is incorporated herein by reference in its entireties.

TECHNICAL FIELD

The present disclosure relates to the technical field of curtains, and in particular, to a connecting rod piece.

BACKGROUND

There are curtains and connecting rod pieces for curtains currently available on the market, and the connecting rod pieces are all integrally formed, so the connecting rod pieces are relatively long, which are inconvenient for transportation and mounting, causing high transportation and mounting costs and great troubles. Therefore, there is an urgent need to provide a connecting rod piece that is convenient to mount and transport on the market to improve the user experience.

SUMMARY

In order to overcome the shortcomings of the prior art, the present disclosure provides aconnecting rod piece, including:
- a hollow first connecting rod unit, wherein a side wall of the first connecting rod unit is provided with a first mounting slot;
- a connecting device, wherein the connecting device has a first end and a second end;
- a hollow second connecting rod unit, wherein a side wall of the second connecting rod unit is provided with a second mounting slot; the first end of the connecting device is detachably connected to the first connecting rod unit, and the second end of the connecting device is detachably connected to the second connecting rod unit; the first mounting slot and the second mounting slot are communicated in sequence to form a mounting channel; the mounting channel is configured to mount a curtain;
- a first locking member, wherein the first locking member detachably locks the first end of the connecting device to the first connecting rod unit; and
- a second locking member, wherein the second locking member detachably locks the second end of the connecting device to the second connecting rod unit.

As an improvement of the present disclosure, the first connecting rod unit has a first mounting opening; the second connecting rod unit has a second mounting opening; the first end of the connecting device is inserted into the first mounting opening, and the second end of the connecting device is inserted into the second mounting opening, to enable the connecting device to combine the first connecting rod unit with the second connecting rod unit into a whole.

As an improvement of the present disclosure, the first end of the connecting device is provided with a first mounting hole; the second end of the connecting device is provided with a second mounting hole; the first connecting rod unit is provided with a third mounting hole; the second connecting rod unit is provided with a fourth mounting hole; and when the first end of the connecting device is inserted into the first connecting rod unit through the first mounting opening, and the second end of the connecting device is inserted into the second connecting rod unit through the second mounting opening, the first locking member passes through the third mounting hole and the first mounting hole in sequence to lock the first end of the connecting device to the first connecting rod unit, and the second locking member passes through the fourth mounting hole and the second mounting hole in sequence to lock the second end of the connecting device to the second connecting rod unit.

As an improvement of the present disclosure, the first mounting hole is internally provided with a first internal thread; the second mounting hole is internally provided with a second internal thread; one end of the first locking member is provided with a first external thread; one end of the second locking member is provided with a second external thread; the other end of the first locking member is provided with a first nut; the other end of the second locking member is provided with a second nut; when the first end of the connecting device is inserted into the first connecting rod unit through the first mounting opening, and the second end of the connecting device is inserted into the second connecting rod unit through the second mounting opening, the first external thread of the first locking member passes through the third mounting hole and the first mounting hole in sequence and is connected to the first internal thread; the first nut is located in the third mounting hole; the first nut is pressed against an inner wall of the third mounting hole; the first end of the connecting device is stopped and locked in the first connecting rod unit; the second external thread of the second locking member passes through the fourth mounting hole and the second mounting hole in sequence and is connected to the second internal thread; the second nut is located in the fourth mounting hole; the second nut is pressed against an inner wall of the fourth mounting hole; and the second end of the connecting device is stopped and locked in the second connecting rod unit.

As an improvement of the present disclosure, the first nut is provided with a first internal hexagonal mounting hole, and the second nut is provided with a second internal hexagonal mounting hole.

As an improvement of the present disclosure, the connecting device includes an upper half part and a lower half part; the first mounting hole and the second mounting hole are both arranged at the upper half part; when the first external thread of the first locking member passes through the third mounting hole and the first mounting hole in sequence and is connected to the first internal thread, one end of the first locking member compresses the lower half part to the inner wall of the first connecting rod unit; and when the second external thread of the second locking member passes through the fourth mounting hole and the second mounting hole in sequence and is connected to the second internal thread, one end of the second locking member compresses the lower half part to the inner wall of the second connecting rod unit.

As an improvement of the present disclosure, the connecting rod piece further includes a third locking member; one end of the third locking member is provided with a third external thread; the other end of the third locking member is provided with a third nut; the upper half part is further provided with a fifth mounting hole; the fifth mounting hole is located between the first mounting hole and the second mounting hole; the fifth mounting hole is internally provided with a third internal thread; the third external thread is connected to the third internal thread; and one end of the third locking member is compressed to the lower half part.

As an improvement of the present disclosure, the first connecting rod unit has a first inner surface and a first outer surface; the first outer surface is recessed towards the first inner surface to form the first mounting slot on the first outer surface and to form a first guide protrusion opposite to the first mounting slot on the first inner surface; the second connecting rod unit has a second inner surface and a second outer surface; the second outer surface is recessed towards the second inner surface to form the second mounting slot on the second outer surface and to form a second guide protrusion opposite to the second mounting slot on the second inner surface; the connecting device is provided with a first guide slot; the first guide slot is connected to the first guide protrusion and the second guide protrusion; the first mounting slot, the first guide slot, and the second mounting slot are communicated in sequence to form the mounting channel; and the mounting channel is configured to mount a curtain.

As an improvement of the present disclosure, a stop protrusion is further arranged on a side wall of the connecting device; the stop protrusion is located between the first end and the second end; one side of the stop protrusion is stopped at the first mounting opening; and the other side of the stop protrusion is stopped at the second mounting opening.

As an improvement of the present disclosure, the first mounting slot extends from one end of the first connecting rod unit to the other end of the first connecting rod unit, and the second mounting slot extends from one end of the second connecting rod unit to the other end of the second connecting rod unit; and the first guide slot extends from the first end of the connecting device to the second end of the connecting device.

As an improvement of the present disclosure, a first positioning protrusion and a second positioning protrusion are arranged on the first inner surface in a protruding manner; the first positioning protrusion and the second positioning protrusion are respectively located on left and right sides of the first inner surface; a first positioning slot is formed among the first positioning protrusion, the second positioning protrusion, and an upper side of the first inner surface; a second positioning slot is formed among the first positioning protrusion, the second positioning protrusion, and a lower side of the first inner surface; one end of the upper half part is inserted into the first positioning slot; one end of the lower half part is inserted into the second positioning slot; a third positioning protrusion and a fourth positioning protrusion are arranged on the second inner surface in a protruding manner; the third positioning protrusion and the fourth positioning protrusion are respectively located on left and right sides of the second inner surface; a third positioning slot is formed among the third positioning protrusion, the fourth positioning protrusion, and an upper side of the second inner surface; a fourth positioning slot is formed among the third positioning protrusion, the fourth positioning protrusion, and a lower side of the second inner surface; the other end of the upper half part is inserted into the third positioning slot; and the other end of the lower half part is inserted into the fourth positioning slot.

As an improvement of the present disclosure, a fifth positioning protrusion is further arranged on the upper side of the first inner surface, and a sixth positioning protrusion is further arranged on the upper side of the second inner surface; when one end of the upper half part is inserted into the first positioning slot, a bottom of the upper half part is pressed against the first positioning protrusion and the second positioning protrusion, and a top of the upper half part is pressed against the fifth positioning protrusion; and when the other end of the upper half part is inserted into the third positioning slot, the bottom of the upper half part is pressed against the third positioning protrusion and the fourth positioning protrusion; and the top of the upper half part is pressed against the sixth positioning protrusion.

As an improvement of the present disclosure, the upper half part has a first upper surface and a first lower surface; both the first upper surface and the first lower surface are flat surfaces; the fifth positioning protrusion and the sixth positioning protrusion are pressed against the first upper surface; and one side of the first positioning protrusion, one side of the second positioning protrusion, one side of the third positioning protrusion, and one side of the fourth positioning protrusion are pressed against the first lower surface.

As an improvement of the present disclosure, the lower half part has a second upper surface and a second lower surface; the second upper surface is a flat surface, and the second lower surface is an arc-shaped surface; the other side of the first positioning protrusion, the other side of the second positioning protrusion, the other side of the third positioning protrusion, and the other side of the fourth positioning protrusion are all pressed against the second upper surface; and the first guide slot is arranged on the first lower surface.

As an improvement of the present disclosure, the connecting rod piecefurther includes a curtain, wherein a first insertion port is arranged at an end portion of the first mounting slot and/or an end portion of the second mounting slot; the curtain has a shading part and a mounting bar; the shading part is connected to the mounting bar; the mounting bar is placed into the mounting channel through the first mounting slot, the first guide slot, and the second mounting slot through the first insertion port in sequence; a first avoidance notch is arranged in axial directions of the first mounting slot, the first guide slot, and the second mounting slot; and the first avoidance notch is configured to avoid the shading part.

As an improvement of the present disclosure, an upper side of the shading part is connected to the shading part after being bent to form an accommodating chamber, and the mounting bar is arranged in the accommodating chamber.

As an improvement of the present disclosure, the shading part is a flexible shading part, and the mounting bar is a flexible mounting bar.

As an improvement of the present disclosure, cross sections of the first mounting slot, the second mounting slot, and the first guide slot are circular.

As an improvement of the present disclosure, the connecting device is a plastic connecting device or a metal connecting device.

As an improvement of the present disclosure, the first connecting rod unit is a first metal connecting rod unit, and the second connecting rod unit is a second metal connecting rod unit.

The present disclosure has the beneficial effects: The present disclosure provides a connecting rod piece. The connecting rod piece includes: a hollow first connecting rod unit, wherein a side wall of the first connecting rod unit is provided with a first mounting slot; a connecting device, wherein the connecting device has a first end and a second end; a hollow second connecting rod unit, wherein a side wall of the second connecting rod unit is provided with a second mounting slot; the first end of the connecting device is detachably connected to the first connecting rod unit, and the second end of the connecting device is detachably connected to the second connecting rod unit; the first mounting slot and the second mounting slot are communicated in sequence to form a mounting channel; the mounting channel is configured to mount a curtain; a first locking member, wherein the first locking member detachably locks the first end of the connecting device to the first connecting rod unit; and a second locking member, wherein the second locking member detachably locks the second end of the connecting device to the second connecting rod unit. When the connecting rod piece needs to be mounted, the first connecting rod unit and the second connecting rod unit can be combined into a whole through the connecting device, and then the curtain is mounted in the first mounting slot to achieve mounting of the curtain and the connecting rod piece. When the connecting rod piece needs to be transported or stored, the curtain can be separated from the first mounting slot, and the first connecting rod unit can be separated from the second connecting rod unit, so as to reduce a length of the connecting rod, which reduces the packaging and logistics costs of the connecting rod piece during the transportation and greatly reduces the transportation cost of the connecting rod piece. Moreover, since the connecting device connects the first connecting rod unit to the second connecting rod unit it is not only convenient for mounting and removal, but also achieves high connection strength. Further, the first locking member detachably locks the first end of the connecting device to the first connecting rod unit, and the second locking member detachably locks the second end of the connecting device to the second connecting rod unit, so that the stability of connection between the first connecting rod unit and the second connecting rod unit can be further improved, and the first connecting rod unit and the second connecting rod unit are prevented from being loosened from the connecting device.

BRIEF DESCRIPTION OF THE DRAWINGS

To describe the technical solutions in the embodiments of the present disclosure more clearly, the following briefly introduces the accompanying drawings for describing the embodiments. The accompanying drawings in the following description show merely some embodiments of the present utility model, and a person of ordinary skill in the art may still derive other drawings from the accompanying drawings without creative efforts.

The present disclosure will be further explained below in conjunction with the accompanying drawings and embodiments.

DETAILED DESCRIPTION OF THE EMBODIMENTS

Figure 1:
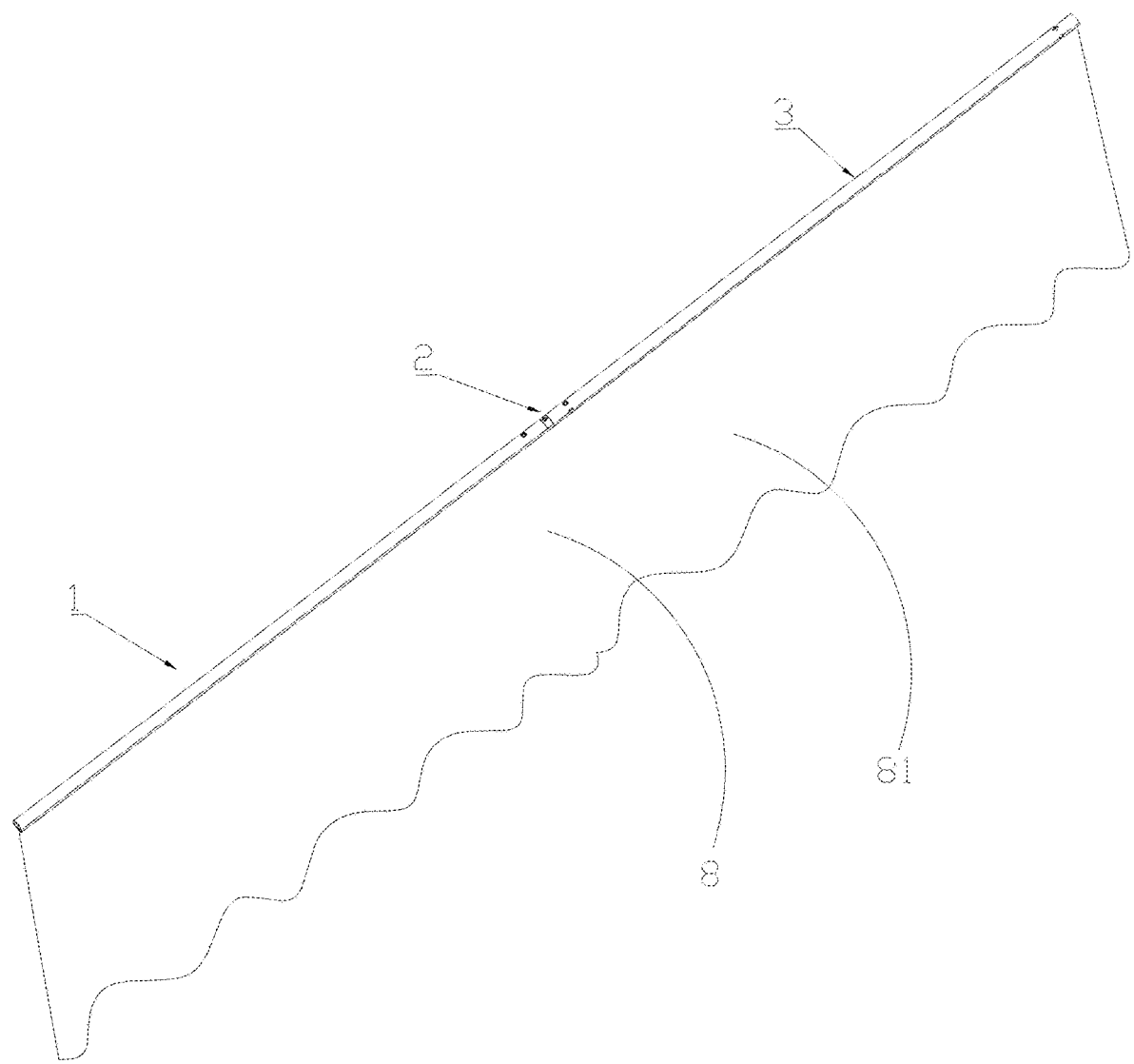
FIG. 1 is a schematic diagram of an entire structure of the present disclosure.
Figure 2:
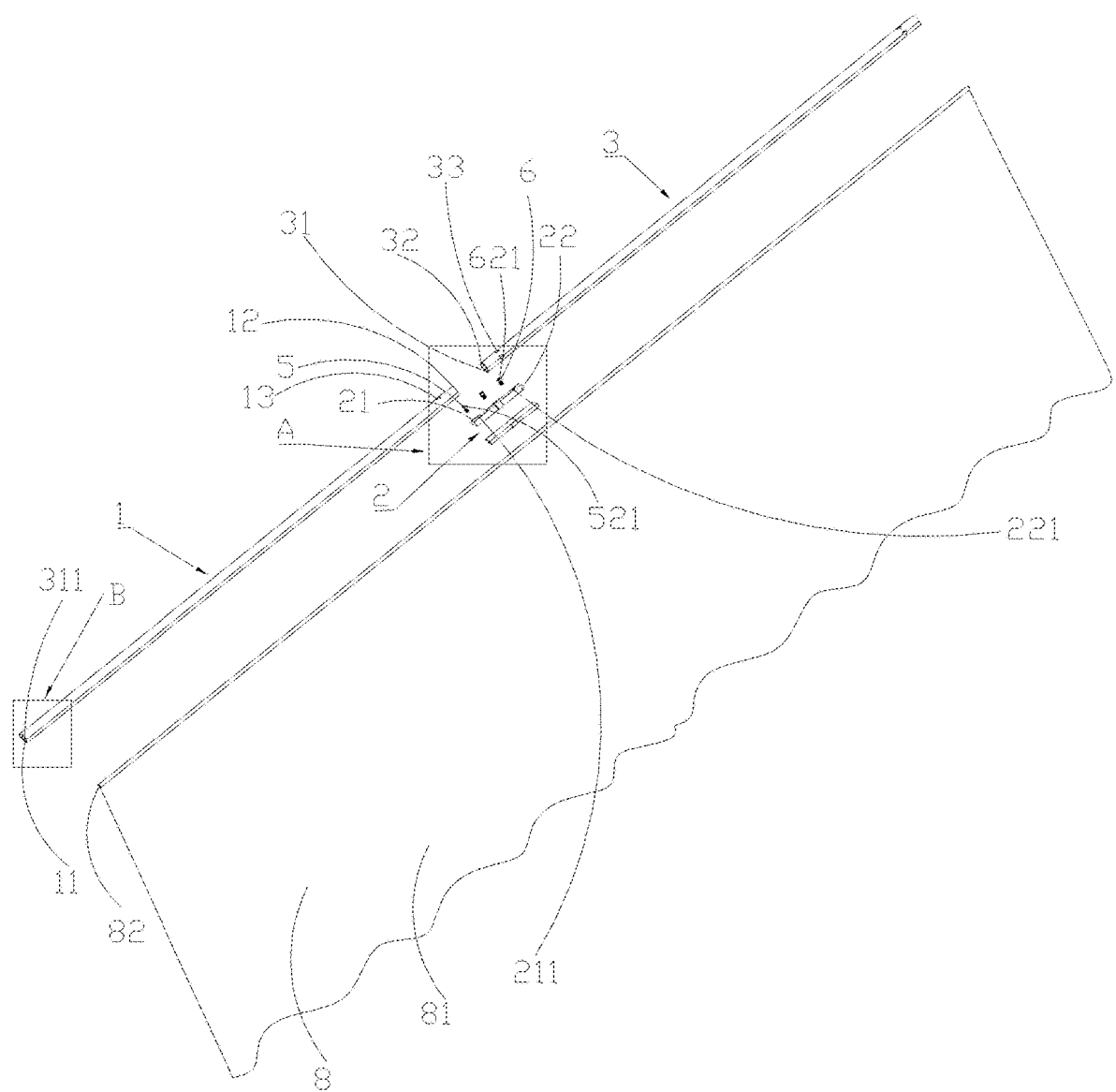
FIG. 2 is an exploded view of the present disclosure.
Figure 3:
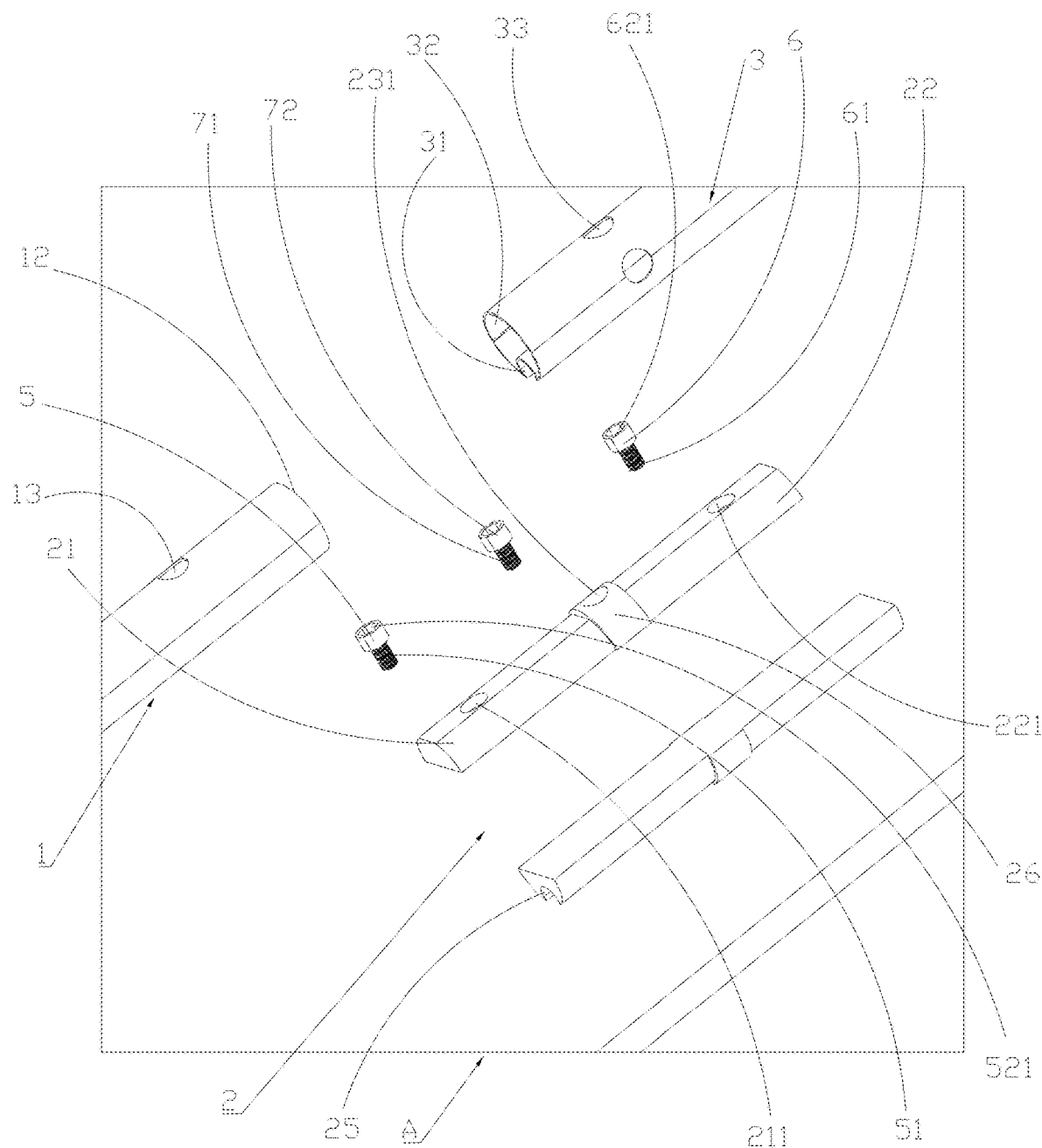
FIG. 3 is an enlarged view of the part A in FIG. 2.
Figure 4:
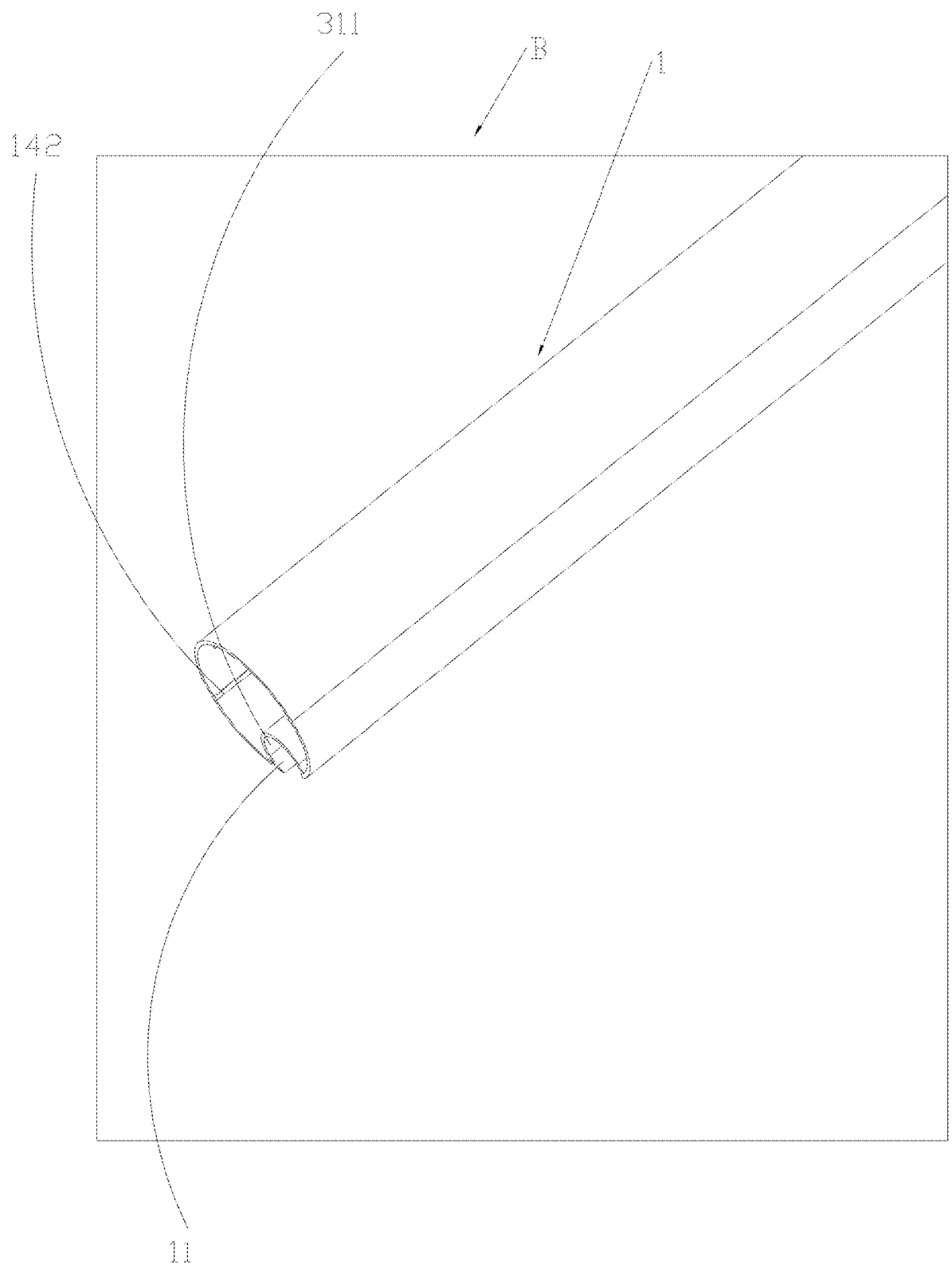
FIG. 4 is an enlarged view of the part B in FIG. 2.
Figure 5:
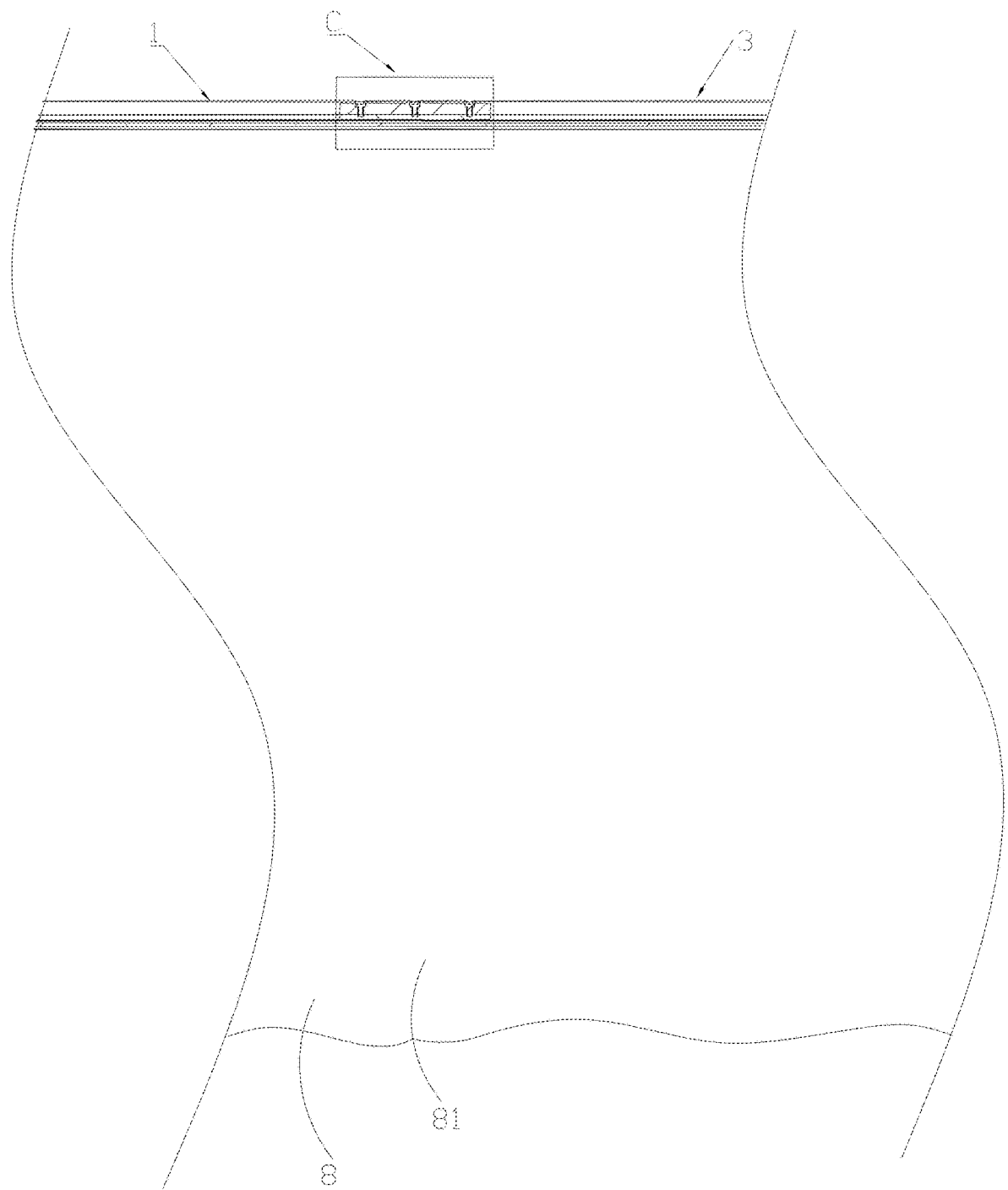
FIG. 5 is a sectional view cut away along a first connecting rod unit, a second connecting rod unit, and a connecting device.
Figure 6:
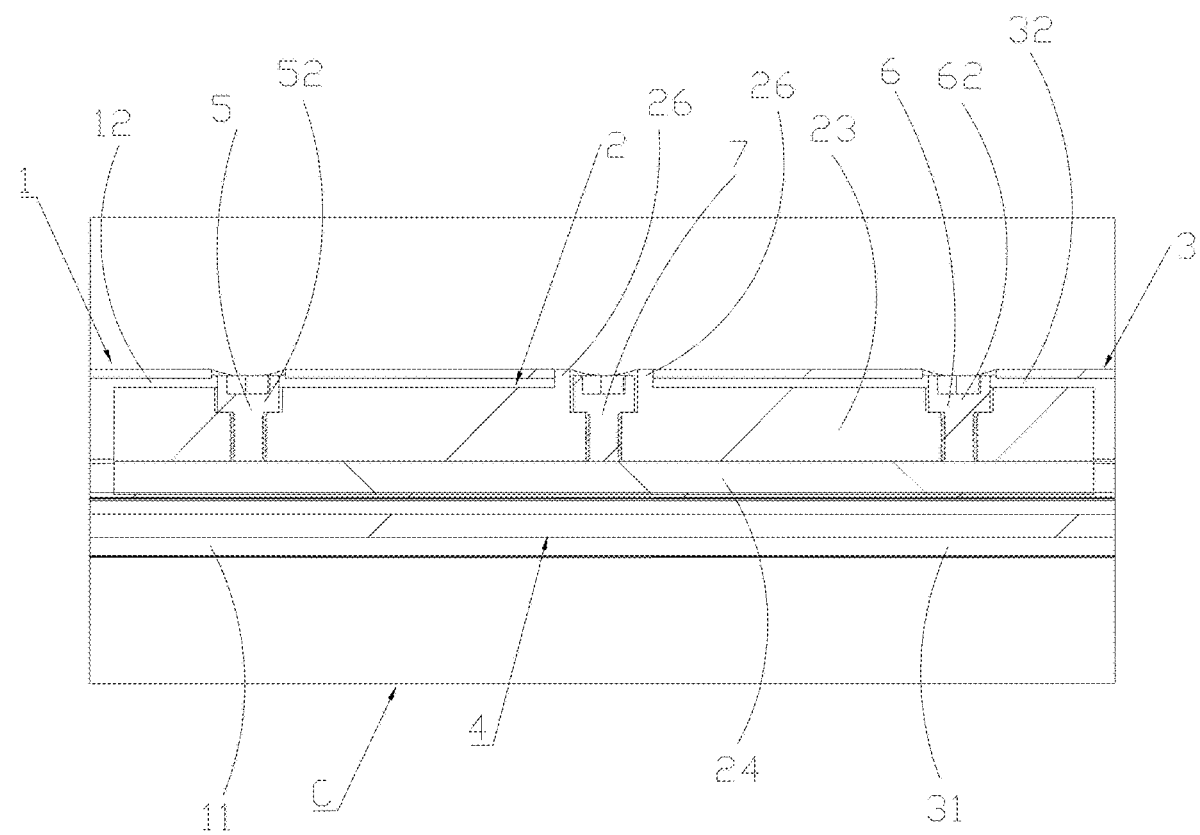
FIG. 6 is an enlarged view of the part C in FIG. 5.
Figure 7:
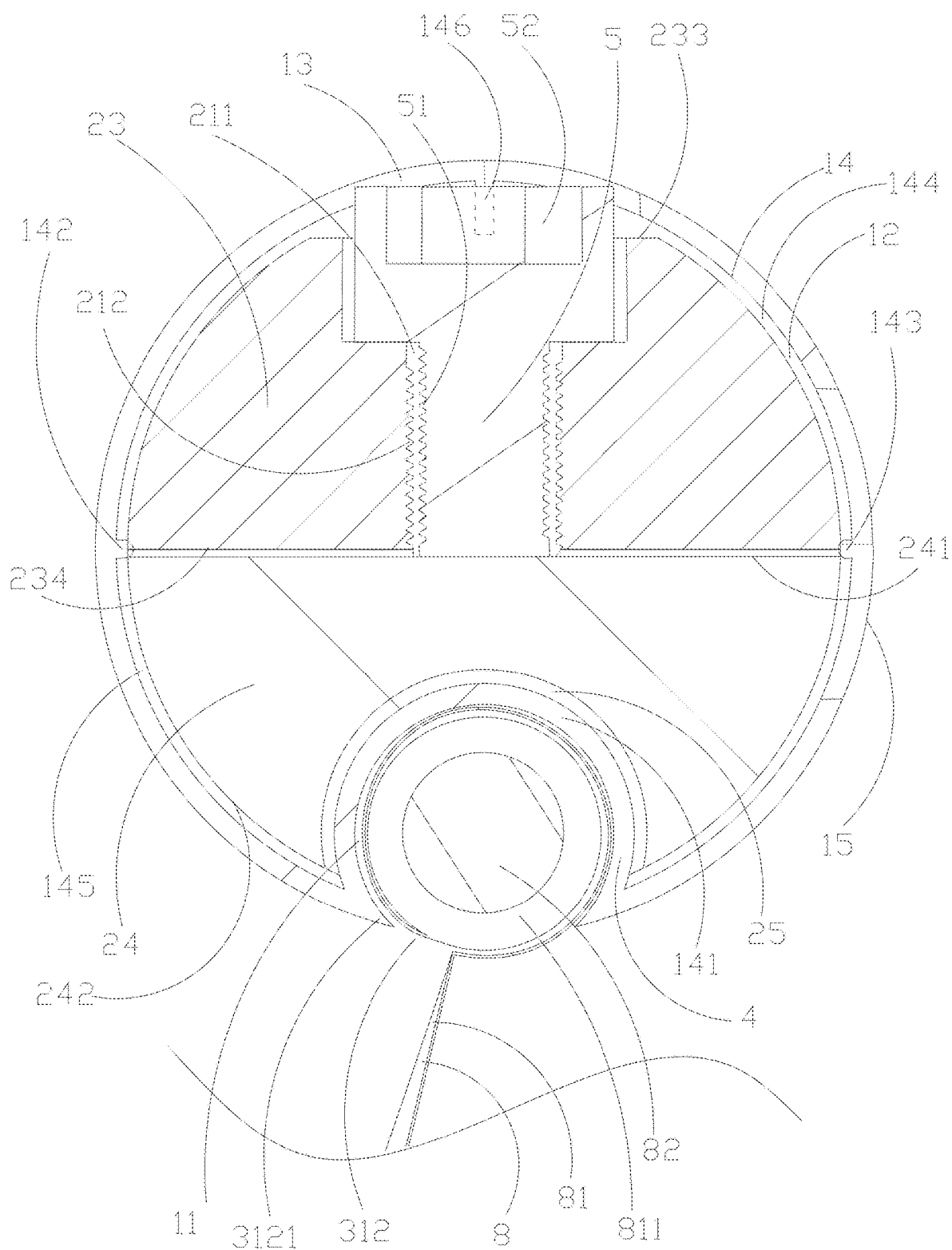
FIG. 7 is a sectional view cut away along a first locking member, a first connecting rod unit, and a connecting device.
Figure 8:
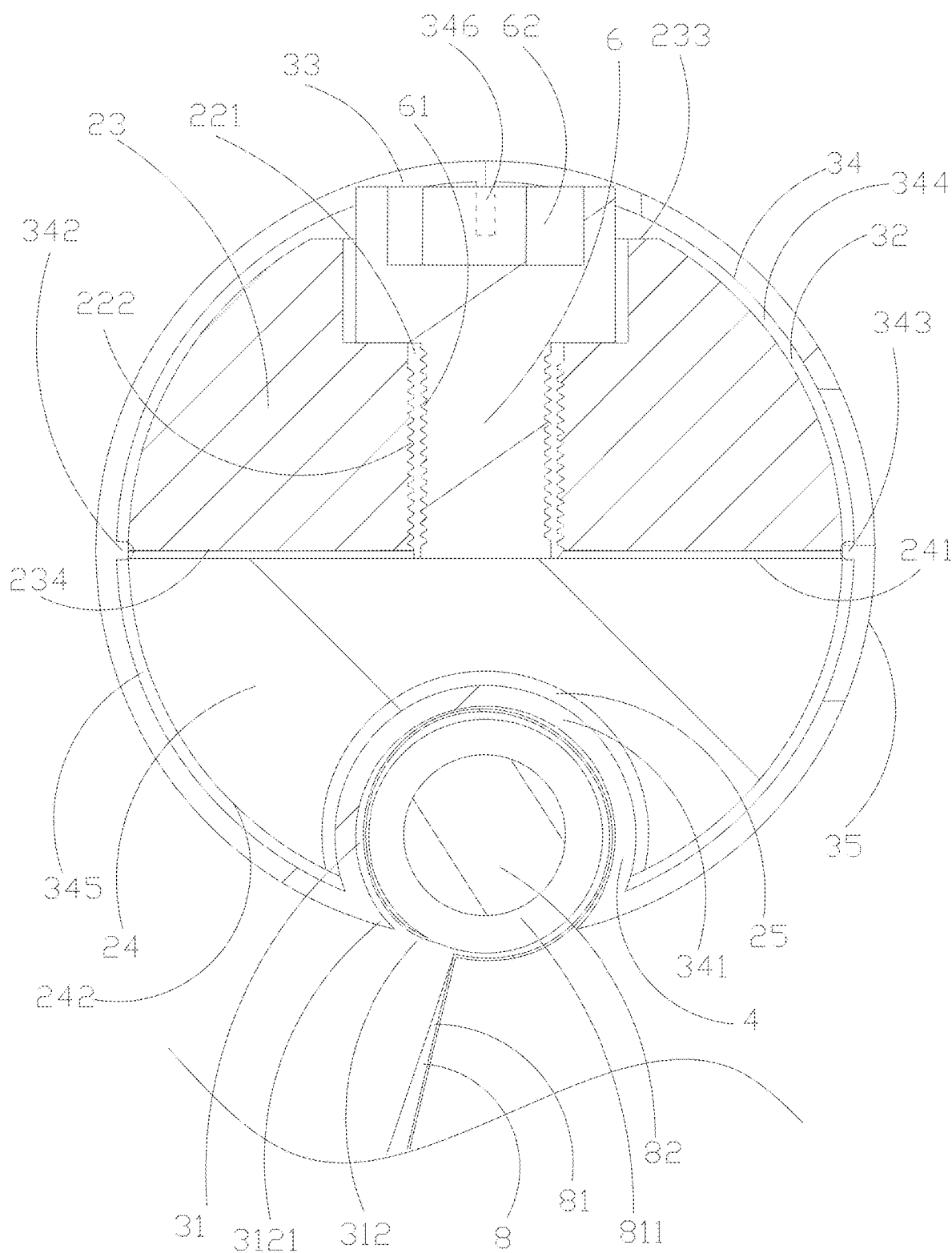
FIG. 8 is a sectional view cut away along a second locking member, a second connecting rod unit, and a connecting device.
Figure 9:
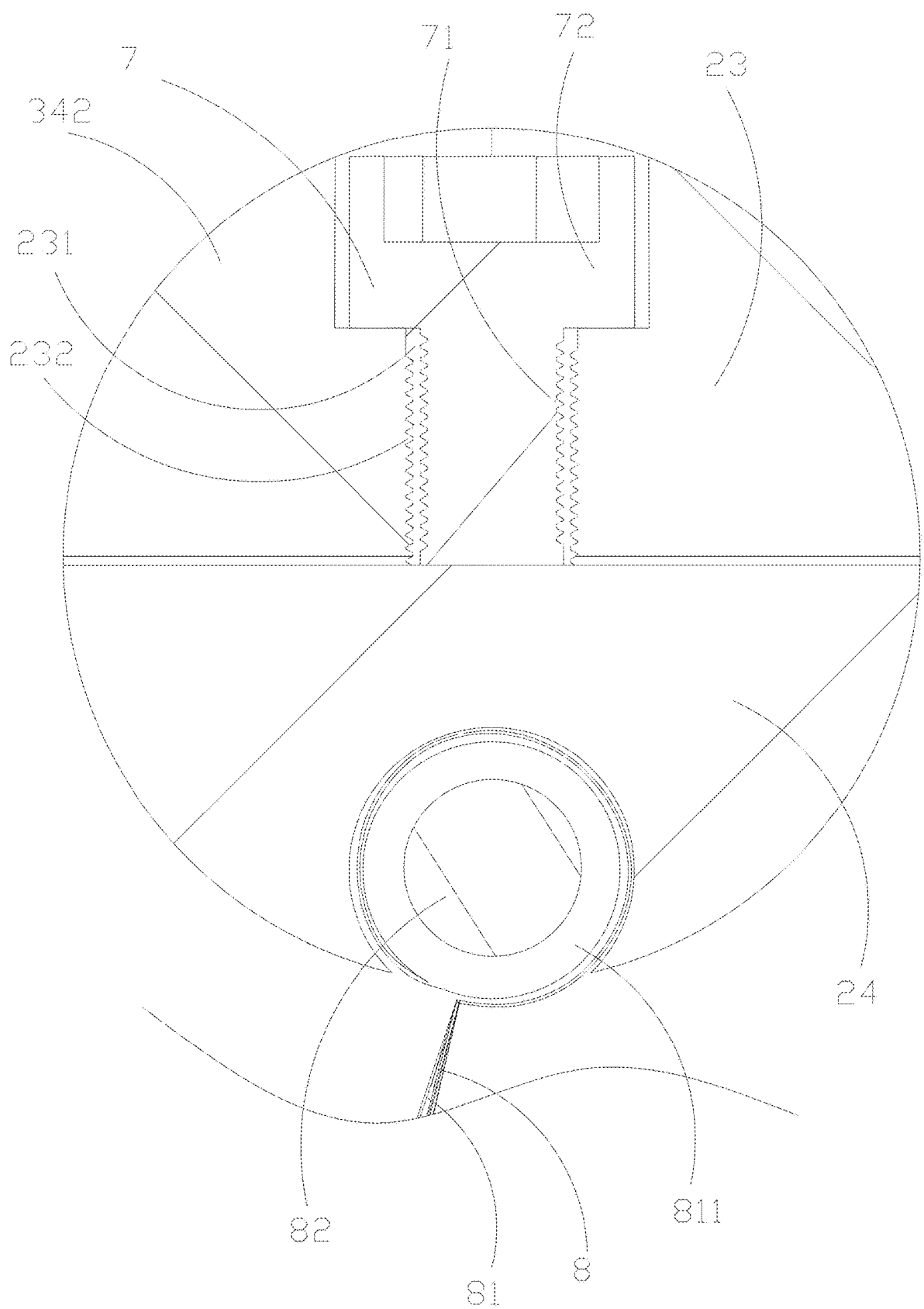
FIG. 9 is a sectional view cut away along a third locking member and a connecting device.

Referring to FIG. 1 to FIG. 9, a connecting rod piece includes:

a hollow first connecting rod unit 1, wherein a side wall of the first connecting rod unit 1 is provided with a first mounting slot 11;

a connecting device 2, wherein the connecting device 2 has a first end 21 and a second end 22;

a hollow second connecting rod unit 3, wherein a side wall of the second connecting rod unit 3 is provided with a second mounting slot 31; the first end 21 of the connecting device 2 is detachably connected to the first connecting rod unit 1, and the second end 22 of the connecting device 2 is detachably connected to the second connecting rod unit 3; the first mounting slot 11 and the second mounting slot 31 are communicated in sequence to form a mounting channel 4; the mounting channel 4 is configured to mount a curtain 8;

a first locking member 5, wherein the first locking member 5 detachably locks the first end 21 of the connecting device 2 to the first connecting rod unit 1; and a second locking member 6, wherein the second locking member 6 detachably locks the second end 22 of the connecting device 2 to the second connecting rod unit 3.

Through the above structure, the connecting rod piece includes: a hollow first connecting rod unit 1, wherein a side wall of the first connecting rod unit 1 is provided with a first mounting slot 11; a connecting device 2, wherein the connecting device 2 has a first end 21 and a second end 22; a hollow second connecting rod unit 3, wherein a side wall of the second connecting rod unit 3 is provided with a second mounting slot 31; the first end 21 of the connecting device 2 is detachably connected to the first connecting rod unit 1, and the second end 22 of the connecting device 2 is detachably connected to the second connecting rod unit 3; the first mounting slot 11 and the second mounting slot 31 are communicated in sequence to form a mounting channel 4; the mounting channel 4 is configured to mount a curtain 8; a first locking member 5, wherein the first locking member 5 detachably locks the first end 21 of the connecting device 2 to the first connecting rod unit 1; and a second locking member 6, wherein the second locking member 6 detachably locks the second end 22 of the connecting device 2 to the second connecting rod unit 3. When the connecting rod piece needs to be mounted, the first connecting rod unit 1 and the second connecting rod unit 3 can be combined into a whole through the connecting device 2, and then the curtain 8 is mounted in the first mounting slot 11 to achieve mounting of the curtain 8 and the connecting rod piece. When the connecting rod piece needs to be transported or stored, the curtain 8 can be separated from the first mounting slot 11, and the first connecting rod unit 1 can be separated from the second connecting rod unit 3, so as to reduce a length of the connecting rod, which reduces the packaging and logistics costs of the connecting rod piece during the transportation and greatly reduces the transportation cost of the connecting rod piece. Moreover, since the connecting device 2 connects the first connecting rod unit 1 to the second connecting rod unit 3, it is not only convenient for mounting and removal, but also achieves high connection strength. Further, the first locking member 5 detachably locks the first end 21 of the connecting device 2 to the first connecting rod unit 1, and the second locking member 6 detachably locks the second end 22 of the connecting device 2 to the second connecting rod unit 3, so that the stability of connection between the first connecting rod unit 1 and the second connecting rod unit 3 can be further improved, and the first connecting rod unit 1 and the second connecting rod unit 3 are prevented from being loosened from the connecting device 2.

In this embodiment, the first connecting rod unit 1 has a first mounting opening 12; the second connecting rod unit 3 has a second mounting opening 32; the first end 21 of the connecting device 2 is inserted into the first mounting opening 12, and the second end 22 of the connecting device 2 is inserted into the second mounting opening 32, to enable the connecting device 2 to combine the first connecting rod unit 1 with the second connecting rod unit 3 into a whole. Through the above structure, the design is reasonable, the structure is simple, and the connection is stable; detachable connection between the first connecting rod unit 1, as well as the second connecting rod unit 3, and the connecting device 2 is effectively achieved; and it is convenient for a user to mount and remove the connecting rod piece.

In this embodiment, the first end 21 of the connecting device 2 is provided with a first mounting hole 211; the second end 22 of the connecting device 2 is provided with a second mounting hole 221; the first connecting rod unit 1 is provided with a third mounting hole 13; the second connecting rod unit 3 is provided with a fourth mounting hole 33; and when the first end 21 of the connecting device 2 is inserted into the first connecting rod unit 1 through the first mounting opening 12, and the second end 22 of the connecting device 2 is inserted into the second connecting rod unit 3 through the second mounting opening 32, the first locking member 5 passes through the third mounting hole 13 and the first mounting hole 211 in sequence to lock the first end 21 of the connecting device 2 to the first connecting rod unit 1, and the second locking member 6 passes through the fourth mounting hole 33 and the second mounting hole 221 in sequence to lock the second end 22 of the connecting device 2 to the second connecting rod unit 3. The first mounting hole 211 is internally provided with a first internal thread 212; the second mounting hole 221 is internally provided with a second internal thread 222; one end of the first locking member 5 is provided with a first external thread 51; one end of the second locking member 6 is provided with a second external thread 61; the other end of the first locking member 5 is provided with a first nut 52; the other end of the second locking member 6 is provided with a second nut 62; when the first end 21 of the connecting device 2 is inserted into the first connecting rod unit 1 through the first mounting opening 12, and the second end 22 of the connecting device 2 is inserted into the second connecting rod unit 3 through the second mounting opening 32, the first external thread 51 of the first locking member 5 passes through the third mounting hole 13 and the first mounting hole 211 in sequence and is connected to the first internal thread 212; the first nut 52 is located in the third mounting hole 13; the first nut 52 can be pressed against an inner wall of the third mounting hole 13; the first end 21 of the connecting device 2 is stopped and locked in the first connecting rod unit 1; the second external thread 61 of the second locking member 6 passes through the fourth mounting hole 33 and the second mounting hole 221 in sequence and is connected to the second internal thread 222; the second nut 62 is located in the fourth mounting hole 33; the second nut 62 can be pressed against an inner wall of the fourth mounting hole 33; and the second end 22 of the connecting device 2 is stopped and locked in the second connecting rod unit 3. Specifically, the first nut 52 is provided with a first internal hexagonal mounting hole 521, and the second nut 62 is provided with a second internal hexagonal mounting hole 621. Through the above structure, the first external thread 51 of the first locking member 5 passes through the third mounting hole 13 and the first mounting hole 211 in sequence and is connected to the first internal thread 212; the first nut 52 is located in the third mounting hole 13; the first nut 52 can be pressed against an inner wall of the third mounting hole 13; the first end 21 of the connecting device 2 is stopped and locked in the first connecting rod unit 1, so as to prevent the first end 21 of the connecting device 2 from being separated from the first connecting rod unit 1, thereby achieving locking between the connecting device 2 and the first connecting rod unit 1 and combining the first connecting rod unit 1 with the connecting device 2 to form a whole. Furthermore, the second external thread 61 of the second locking member 6 passes through the fourth mounting hole 33 and the second mounting hole 221 in sequence and is connected to the second internal thread 222; the second nut 62 is located in the fourth mounting hole 33; the second nut 62 can be pressed against an inner wall of the fourth mounting hole 33; and the second end 22 of the connecting device 2 is stopped and locked in the second connecting rod unit 3, so as to prevent the second end 22 of the connecting device 2 from being separated from the second connecting rod unit 3, thereby achieving locking between the connecting device 2 and the second connecting rod unit 3 and combining the first connecting rod unit 1, the connecting device 2, and the second connecting rod unit 3 to form a whole.

In this embodiment, the connecting device 2 includes an upper half part 23 and a lower half part 24; the first mounting hole 211 and the second mounting hole 221 are both arranged at the upper half part 23; when the first external thread 51 of the first locking member 5 passes through the third mounting hole 13 and the first mounting hole 211 in sequence and is connected to the first internal thread 212, one end of the first locking member 5 compresses the lower half part 24 to the inner wall of the first connecting rod unit 1; and when the second external thread 61 of the second locking member 6 passes through the fourth mounting hole 33 and the second mounting hole 221 in sequence and is connected to the second internal thread 222, one end of the second locking member 6 compresses the lower half part 24 to the inner wall of the second connecting rod unit 3. The connecting rod piece further includes a third locking member 7; one end of the third locking member 7 is provided with a third external thread 71; the other end of the third locking member 7 is provided with a third nut 72; the upper half part 23 is further provided with a fifth mounting hole 231; the fifth mounting hole 231 is located between the first mounting hole 211 and the second mounting hole 221; the fifth mounting hole 231 is internally provided with a third internal thread 232; the third external thread 71 is connected to the third internal thread 232; and one end of the third locking member 7 is compressed to the lower half part 24. Through the above structure, one end of the first locking member 5 compresses the lower half part 24 to the inner wall of the first connecting rod unit 1, and one end of the second locking member 6 compresses the lower half part 24 to the inner wall of the second connecting rod unit 3, so that the lower half part 24 can be tightly connected to the first connecting rod unit 1 and the second connecting rod unit 3. This can not only prevent the lower half part 24 from being loosened from the first connecting rod unit 1 and the second connecting rod unit 3, but also prevent the lower half part from shaking. Furthermore, the first locking member 5 and the second locking member 6 compress the lower half part 24 to the first connecting rod unit 1 and the second connecting rod unit 3, so that no threaded hole needs to be formed in the lower half part 24. This can also shorten the first locking member 5, reduce the production cost, and facilitate a user to mount and remove the connecting rod piece.

In this embodiment, the first connecting rod unit 1 has a first inner surface 14 and a first outer surface 15; the first outer surface 15 is recessed towards the first inner surface 14 to form the first mounting slot 11 on the first outer surface 15 and to form a first guide protrusion 141 opposite to the first mounting slot 11 on the first inner surface 14; the second connecting rod unit 3 has a second inner surface 34 and a second outer surface 35; the second outer surface 35 is recessed towards the second inner surface 34 to form the second mounting slot 31 on the second outer surface 35 and to form a second guide protrusion 341 opposite to the second mounting slot 31 on the second inner surface 34; the connecting device 2 is provided with a first guide slot 25; the first guide slot 25 is connected to the first guide protrusion 141 and the second guide protrusion 341; the first mounting slot 11, the first guide slot 25, and the second mounting slot 31 are communicated in sequence to form the mounting channel 4; and the mounting channel 4 is configured to mount a curtain 8. Through the above structure, the first guide slot 25 is connected to the first guide protrusion 141 and the second guide protrusion 341, so that it can be convenient for a user to precisely connect the connecting device 2 to the first connecting rod unit 1 and the second connecting rod unit 3, and the mounting efficiency of the connecting rod piece is improved.

In this embodiment, a stop protrusion 26 is further arranged on a side wall of the connecting device 2; the stop protrusion is located between the first end and the second end; one side of the stop protrusion 26 is stopped at the first mounting opening 12; and the other side of the stop protrusion 26 is stopped at the second mounting opening 32. Through the above structure, precise connection between the connecting device 2 and the first connecting rod unit 1, as well as the second connecting rod unit 3, is effectively achieved, which prevents the connecting device 2 from being excessively inserted into the first mounting opening or the second mounting opening 32.

In this embodiment, the first mounting slot 11 extends from one end of the first connecting rod unit 1 to the other end of the first connecting rod unit 1, and the second mounting slot 31 extends from one end of the second connecting rod unit 3 to the other end of the second connecting rod unit 3; and the first guide slot 25 extends from the first end 21 of the connecting device 2 to the second end 22 of the connecting device 2. A first positioning protrusion 142 and a second positioning protrusion 143 are arranged on the first inner surface 14 in a protruding manner; the first positioning protrusion 142 and the second positioning protrusion 143 are respectively located on left and right sides of the first inner surface 14; a first positioning slot 144 is formed among the first positioning protrusion 142, the second positioning protrusion 143, and an upper side of the first inner surface 14; a second positioning slot 145 is formed among the first positioning protrusion 142, the second positioning protrusion 143, and a lower side of the first inner surface 14; one end of the upper half part 23 is inserted into the first positioning slot 144; one end of the lower half part 24 is inserted into the second positioning slot 145; a third positioning protrusion 342 and a fourth positioning protrusion 343 are arranged on the second inner surface 34 in a protruding manner; the third positioning protrusion 342 and the fourth positioning protrusion 343 are respectively located on left and right sides of the second inner surface 34; a third positioning slot 344 is formed among the third positioning protrusion 342, the fourth positioning protrusion 343, and an upper side of the second inner surface 34; a fourth positioning slot 345 is formed among the third positioning protrusion 342, the fourth positioning protrusion 343, and a lower side of the second inner surface 34; the other end of the upper half part 23 is inserted into the third positioning slot 344; and the other end of the lower half part 24 is inserted into the fourth positioning slot 345. Specifically, a fifth positioning protrusion 146 is further arranged on the upper side of the first inner surface 14, and a sixth positioning protrusion 346 is further arranged on the upper side of the second inner surface 34; when one end of the upper half part 23 is inserted into the first positioning slot 144, a bottom of the upper half part 23 is pressed against the first positioning protrusion 142 and the second positioning protrusion 143, and a top of the upper half part 23 is pressed against the fifth positioning protrusion 146; and when the other end of the upper half part 23 is inserted into the third positioning slot 344, the bottom of the upper half part 23 is pressed against the third positioning protrusion 342 and the fourth positioning protrusion 343; and the top of the upper half part 23 is pressed against the sixth positioning protrusion 346. Further, the upper half part 23 has a first upper surface 233 and a first lower surface 234; both the first upper surface 233 and the first lower surface 234 are flat surfaces; the fifth positioning protrusion 146 and the sixth positioning protrusion 346 are pressed against the first upper surface 233; and one side of the first positioning protrusion 142, one side of the second positioning protrusion 143, one side of the third positioning protrusion 342, and one side of the fourth positioning protrusion 343 are pressed against the first lower surface 234. Much further, the lower half part 24 has a second upper surface 241 and a second lower surface 242; the second upper surface 241 is a flat surface, and the second lower surface 242 is an arc-shaped surface; the other side of the first positioning protrusion 142, the other side of the second positioning protrusion 143, the other side of the third positioning protrusion 342, and the other side of the fourth positioning protrusion 343 are all pressed against the second upper surface 241; and the first guide slot 25 is arranged on the first lower surface 234. Through the above structure, due to the arrangement of the first positioning slot 144, the second positioning slot 145, the third positioning slot 344, and the fourth positioning slot 345, it can be convenient for a user to precisely and quickly mount the upper half part 23 and the lower half part 24 on the first connecting rod unit 1 and the second connecting rod unit 3, so that the upper half part 23 and the lower half part 24 combine the first connecting rod unit 1 with the second connecting rod unit 3 into a whole.

In this embodiment, the connecting rod piece further includes a curtain 8, wherein a first insertion port 311 is arranged at an end portion of the first mounting slot 11 and/or an end portion of the second mounting slot 31; the curtain 8 has a shading part 81 and a mounting bar 82; the shading part 81 is connected to the mounting bar 82; the mounting bar 82 is placed into the mounting channel 4 through the first mounting slot 11, the first guide slot 25, and the second mounting slot 31 through the first insertion port 311 in sequence; a first avoidance notch 312 is arranged in axial directions of the first mounting slot 11, the first guide slot 25, and the second mounting slot 31; and the first avoidance notch 312 is configured to avoid the shading part 81. An upper side of the shading part 81 is connected to the shading part 81 after being bent to form an accommodating chamber 811, and the mounting bar 82 is arranged in the accommodating chamber 811. Specifically, the shading part 81 is a flexible shading part 81, and the mounting bar 82 is a flexible mounting bar 82. Through the above structure, the mounting bar 82 of the curtain 8 can be inserted into the first insertion port 311, and the first avoidance notch 312 can allow the shading part 81 to slide along with the mounting bar 82 in the first insertion port, so as to complete the mounting of the curtain 8. Furthermore, the shading part 81 is a flexible shading part 81, and the mounting bar 82 is a flexible mounting bar 82. When transportation and storage are required, the shading part 81 and the mounting bar 82 can be folded for storage and transportation, which further reduces the transportation cost. Furthermore, when no shading is required, the flexible shading part 81 can be rolled up; when the shading part 81 needs to be used, the shading part is then unfolded for use. The operation is convenient, and usage requirements of a user in different scenarios can be met.

In this embodiment, cross sections of the first mounting slot 11, the second mounting slot 31, and the first guide slot 25 are circular. The connecting device 2 is a plastic connecting device 2 or a metal connecting device 2. Specifically, the first connecting rod unit 1 is a first metal connecting rod unit, and the second connecting rod unit 3 is a second metal connecting rod unit. Further, a third stop edge 3121 is arranged at the first avoidance notch 312, and the third stop edge 3121 is configured to stop the mounting bar 82 in the first mounting slot 11 and the second mounting slot 31, to prevent the mounting bar 82 from sliding out of the first mounting slot 11 and the second mounting slot 31 through the first avoidance notch 312.

One or more implementation modes are provided above in combination with specific contents, and it is not deemed that the specific implementation of the present disclosure is limited to these specifications. Any technical deductions or replacements approximate or similar to the method and structure of the present disclosure or made under the concept of the present disclosure shall fall within the scope of protection of the present disclosure.

What is claimed is:

1. A connecting rod piece, comprising:
    a hollow first connecting rod unit, wherein a side wall of the first connecting rod unit is provided with a first mounting slot;
    a connecting device, wherein the connecting device has a first end and a second end;
    a hollow second connecting rod unit, wherein a side wall of the second connecting rod unit is provided with a second mounting slot; the first end of the connecting device is detachably connected to the first connecting rod unit, and the second end of the connecting device is detachably connected to the second connecting rod unit; the first mounting slot and the second mounting slot are in communication to form a mounting channel; the mounting channel is configured to mount a curtain;
    a first locking member, wherein the first locking member detachably locks the first end of the connecting device to the first connecting rod unit; and
    a second locking member, wherein the second locking member detachably locks the second end of the connecting device to the second connecting rod unit;
    wherein the first connecting rod unit has a first mounting opening; the second connecting rod unit has a second mounting opening; the first end of the connecting device is inserted into the first mounting opening, and the second end of the connecting device is inserted into the second mounting opening so that the first connecting rod unit and the second connecting rod unit are connected as a whole;
    wherein the first end of the connecting device is provided with a first mounting hole; the second end of the connecting device is provided with a second mounting hole; the first connecting rod unit is provided with a third mounting hole; the second connecting rod unit is provided with a fourth mounting hole; and when the first end of the connecting device is inserted into the first connecting rod unit through the first mounting opening, and the second end of the connecting device is inserted into the second connecting rod unit through the second mounting opening, the first locking member passes through the third mounting hole and the first mounting hole in sequence to lock the first end of the connecting device to the first connecting rod unit, and the second locking member passes through the fourth mounting hole and the second mounting hole in sequence to lock the second end of the connecting device to the second connecting rod unit;
    wherein the first mounting hole is internally provided with a first internal thread; the second mounting hole is internally provided with a second internal thread; one end of the first locking member is provided with a first external thread, and an opposite end of the first locking member is provided with a first nut; one end of the second locking member is provided with a second external thread, and an opposite end of the second locking member is provided with a second nut; when the first end of the connecting device is inserted into the first connecting rod unit through the first mounting opening, and the second end of the connecting device is inserted into the second connecting rod unit through the second mounting opening, the first external thread of the first locking member passes through the third mounting hole and the first mounting hole in sequence and is connected to the first internal thread; the first nut is located in the third mounting hole; the first nut is pressed against an inner wall of the third mounting hole; the first end of the connecting device is stopped and locked in the first connecting rod unit; the second external thread of the second locking member passes through the fourth mounting hole and the second mounting hole in sequence and is connected to the second internal thread; the second nut is located in the fourth mounting hole; the second nut is pressed against an inner wall of the fourth mounting hole; and the second end of the connecting device is stopped and locked in the second connecting rod unit;
    wherein the connecting device comprises an upper half part and a lower half part; the first mounting hole and the second mounting hole are both arranged at the upper half part; when the first external thread of the first locking member passes through the third mounting hole and the first mounting hole in sequence and is connected to the first internal thread, the end of the first locking member with the first external thread compresses the lower half part to an inner wall of the first connecting rod unit; and when the second external thread of the second locking member passes through the fourth mounting hole and the second mounting hole in sequence and is connected to the second internal thread, the end of the second locking member with the second external thread compresses the lower half part to an inner wall of the second connecting rod unit;

wherein the first connecting rod unit has a first inner surface and a first outer surface; the first outer surface is recessed towards the first inner surface to form the first mounting slot on the first outer surface and to form a first guide protrusion opposite to the first mounting slot on the first inner surface; the second connecting rod unit has a second inner surface and a second outer surface; the second outer surface is recessed towards the second inner surface to form the second mounting slot on the second outer surface and to form a second guide protrusion opposite to the second mounting slot on the second inner surface; the connecting device is provided with a first guide slot; the first guide slot is connected to the first guide protrusion and the second guide protrusion; the first mounting slot, the first guide slot, and the second mounting slot are in communication sequentially to form the mounting channel; and the mounting channel is configured to mount a curtain;

wherein a first positioning protrusion and a second positioning protrusion are arranged on the first inner surface in a protruding manner; the first positioning protrusion and the second positioning protrusion are respectively located on left and right sides of the first inner surface; a first positioning slot is formed among the first positioning protrusion, the second positioning protrusion, and an upper side of the first inner surface; a second positioning slot is formed among the first positioning protrusion, the second positioning protrusion, and a lower side of the first inner surface; one end of the upper half part is inserted into the first positioning slot; one end of the lower half part is inserted into the second positioning slot; a third positioning protrusion and a fourth positioning protrusion are arranged on the second inner surface in a protruding manner; the third positioning protrusion and the fourth positioning protrusion are respectively located on left and right sides of the second inner surface; a third positioning slot is formed among the third positioning protrusion, the fourth positioning protrusion, and an upper side of the second inner surface; a fourth positioning slot is formed among the third positioning protrusion, the fourth positioning protrusion, and a lower side of the second inner surface; an opposite end of the upper half part is inserted into the third positioning slot; and an opposite end of the lower half part is inserted into the fourth positioning slot.

2. The connecting rod piece according to claim 1, wherein a fifth positioning protrusion is further arranged on the upper side of the first inner surface, and a sixth positioning protrusion is further arranged on the upper side of the second inner surface; when one end of the upper half part is inserted into the first positioning slot, a bottom of the upper half part is pressed against the first positioning protrusion and the second positioning protrusion, and a top of the upper half part is pressed against the fifth positioning protrusion; and when the other end of the upper half part is inserted into the third positioning slot, the bottom of the upper half part is pressed against the third positioning protrusion and the fourth positioning protrusion; and the top of the upper half part is pressed against the sixth positioning protrusion.

3. The connecting rod piece according to claim 2, wherein the upper half part has a first upper surface and a first lower surface; both the first upper surface and the first lower surface are flat surfaces; the fifth positioning protrusion and the sixth positioning protrusion are pressed against the first upper surface; and a first side of the first positioning protrusion, a first side of the second positioning protrusion, a first side of the third positioning protrusion, and a first side of the fourth positioning protrusion are pressed against the first lower surface.

4. The connecting rod piece according to claim 3, wherein the lower half part has a second upper surface and a second lower surface; the second upper surface is a flat surface, and the second lower surface is an arc-shaped surface; a second side of the first positioning protrusion, a second side of the second positioning protrusion, a second side of the third positioning protrusion, and a second side of the fourth positioning protrusion are all pressed against the second upper surface; and the first guide slot is arranged on the first lower surface.

5. The connecting rod piece according to claim 1, wherein cross sections of the first mounting slot, the second mounting slot, and the first guide slot are circular.

6. The connecting rod piece according to claim 1, wherein the connecting device is a plastic connecting device or a metal connecting device.

7. The connecting rod piece according to claim 1, wherein the first connecting rod unit is a first metal connecting rod unit, and the second connecting rod unit is a second metal connecting rod unit.

* * * * *